United States Patent [19]
Dilko et al.

[11] Patent Number: 5,216,576
[45] Date of Patent: Jun. 1, 1993

[54] PANEL BOARD WITH ADJUSTABLE FRAME AND SIDE RAILS

[75] Inventors: Christina A. Dilko, West Hartford; David A. Reid, Forestville; Dean A. Robarge, New Britain, all of Conn.

[73] Assignee: General Electric Company, New York, N.Y.

[21] Appl. No.: 929,049

[22] Filed: Aug. 13, 1992

[51] Int. Cl.⁵ ............................................. H02B 1/015
[52] U.S. Cl. ................................... 361/358; 361/356; 361/362; 361/429
[58] Field of Search ............... 361/331, 338, 356–362, 361/429

[56] References Cited

U.S. PATENT DOCUMENTS

| | | | |
|---|---|---|---|
| 926,154 | 6/1909 | Walker et al. | 361/362 |
| 929,812 | 8/1909 | Adams | 361/362 |
| 1,504,478 | 8/1924 | Hyser | 361/362 |
| 1,878,336 | 9/1932 | Shull | 361/362 |
| 2,630,477 | 3/1953 | Rypinski | 175/308 |
| 2,760,123 | 8/1956 | Wills | 317/119 |
| 3,356,907 | 12/1967 | Bragulat | 317/120 |

Primary Examiner—Gregory D. Thompson
Attorney, Agent, or Firm—Richard A. Menelly

[57] ABSTRACT

An adjustable frame is slidable front-to-back within slots in cross members rigidly mounted to the box of a panel board assembly, as the last step in the installation procedure, by virtue of lips which allow drawing the frame forwardly into contact with the door frame assembly after it is secured to the box. The frame has slotted holes cooperating with bolts in the cross members, which can be tightened after assembly and adjustment is completed. Panels which mount electrical protective devices or serve as filler plates are trapped in slots formed in sideward-adjustable side rails which are thereafter secured by bolts to the cross pieces.

11 Claims, 4 Drawing Sheets

PANEL BOARD WITH ADJUSTABLE FRAME AND SIDE RAILS

BACKGROUND OF THE INVENTION

To accommodate the lack of alignment between a building wall and the front of a box comprising the main structure of an electric panel board assembly, many different approaches have been taken. In U.S. Pat. No. 2,760,123 the components themselves, switches, circuit breakers and the like, are mounted on a panel which is resiliently urged toward the door/frame assembly of the panel board. In this device, the electrical components are thus only loosely held within the panel board. If the components are pushed against while servicing them, the entire component-mounting panel can travel inwardly causing gaps. In U.S. Pat. No. 2,630,477 and U.S. Pat. No. 3,356,907, the components are firmly attached to the box, and there are cooperating cover pan and dish assemblies that provide parallel walls which slide relative to each other so as to accommodate a varying box depth as a function of the misalignment between the box and the wall. These are resiliently urged toward the face or front surface of the panel board. This in turn requires spring-loaded preassembly of the various parts which can be expensive and requires careful handling in installation. In addition, none of these structures remain in place when the cover is removed.

Purposes of the present invention include simplified manufacturing and installation of a panel board which has complete metal integrity. A principal purpose of the present invention is to permit adjustment of a panel board to accommodate misalignment between it and a wall structure as the final step in the installation procedure. Another purpose of the invention is to provide adjustable, metal integrity to the interior of a panel board which is, after adjusting, rigid and permanently in place. Another purpose of the invention is to provide an adjustable panel board interior which accommodates misalignment of the panel board with respect to the wall structure which has a clean, uncluttered interior. A further purpose of the invention is to provide an adjustable, yet structurally rigid relationship between side rails and component panels or filler plates in the panel board.

SUMMARY OF THE INVENTION

One aspect of the invention comprises an adjustable frame which provides side and end walls that are slidable in front-to-back relationship with cross members which are rigidly secured to the box of the panel board. The frame may slide in slots formed in the cross members. The adjustable frame may include lips which allow drawing the frame tightly to the door/frame assembly after it is installed, with the door open, and stepped edges which accommodate sideward misalignment. Another aspect of the present invention provides trapping of the end edges of the panels (which mount circuit protective devices and other electrical components or serve as filler plates) in slots of side rails which are adjustable with respect to cross pieces rigidly mounted within the box of the panel board.

DESCRIPTION OF THE PREFERRED EMBODIMENT

Figure 1:
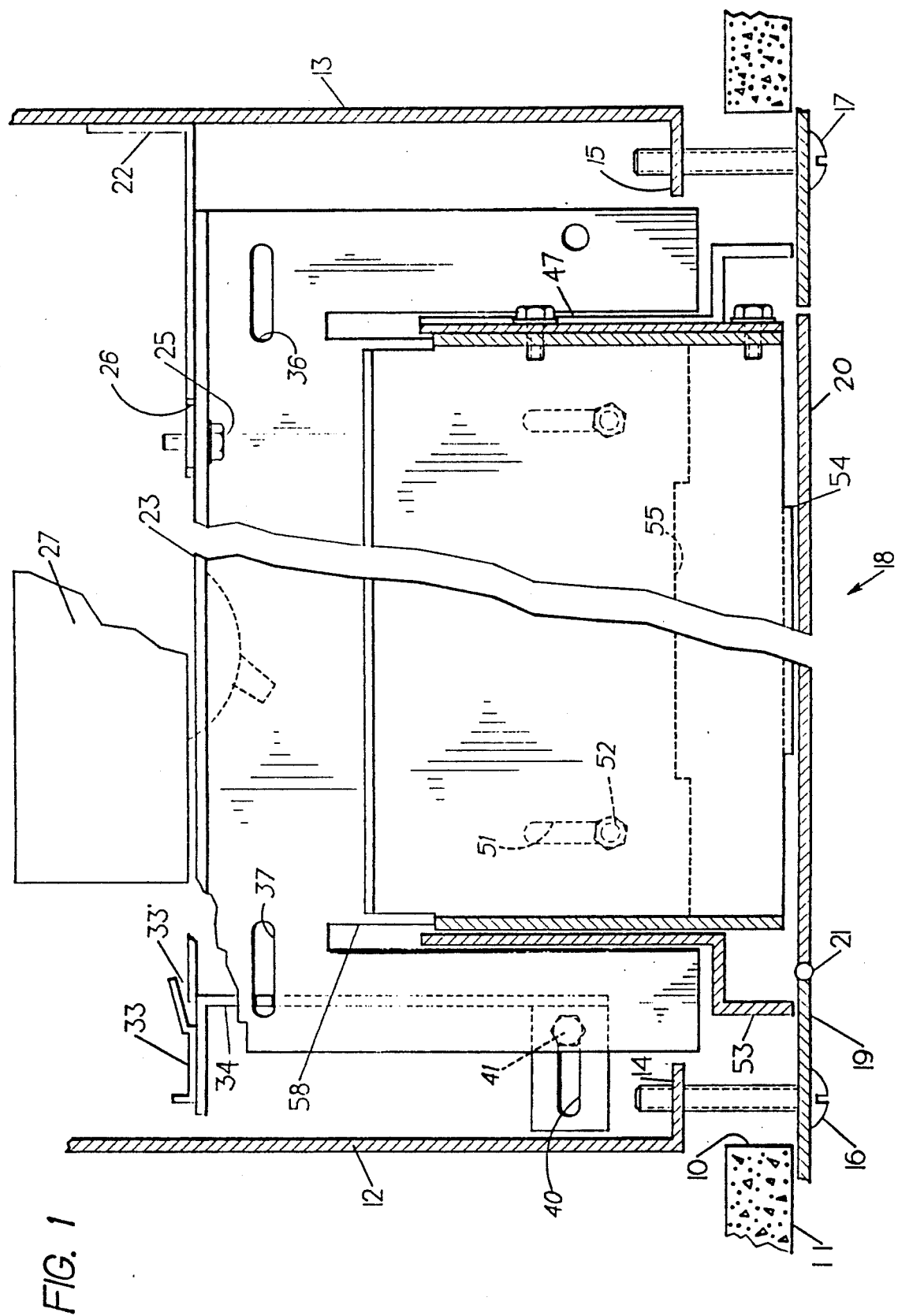
FIG. 1 is a partially sectioned, partially broken away top plan view of a panel board incorporating the present invention.
Figure 2:
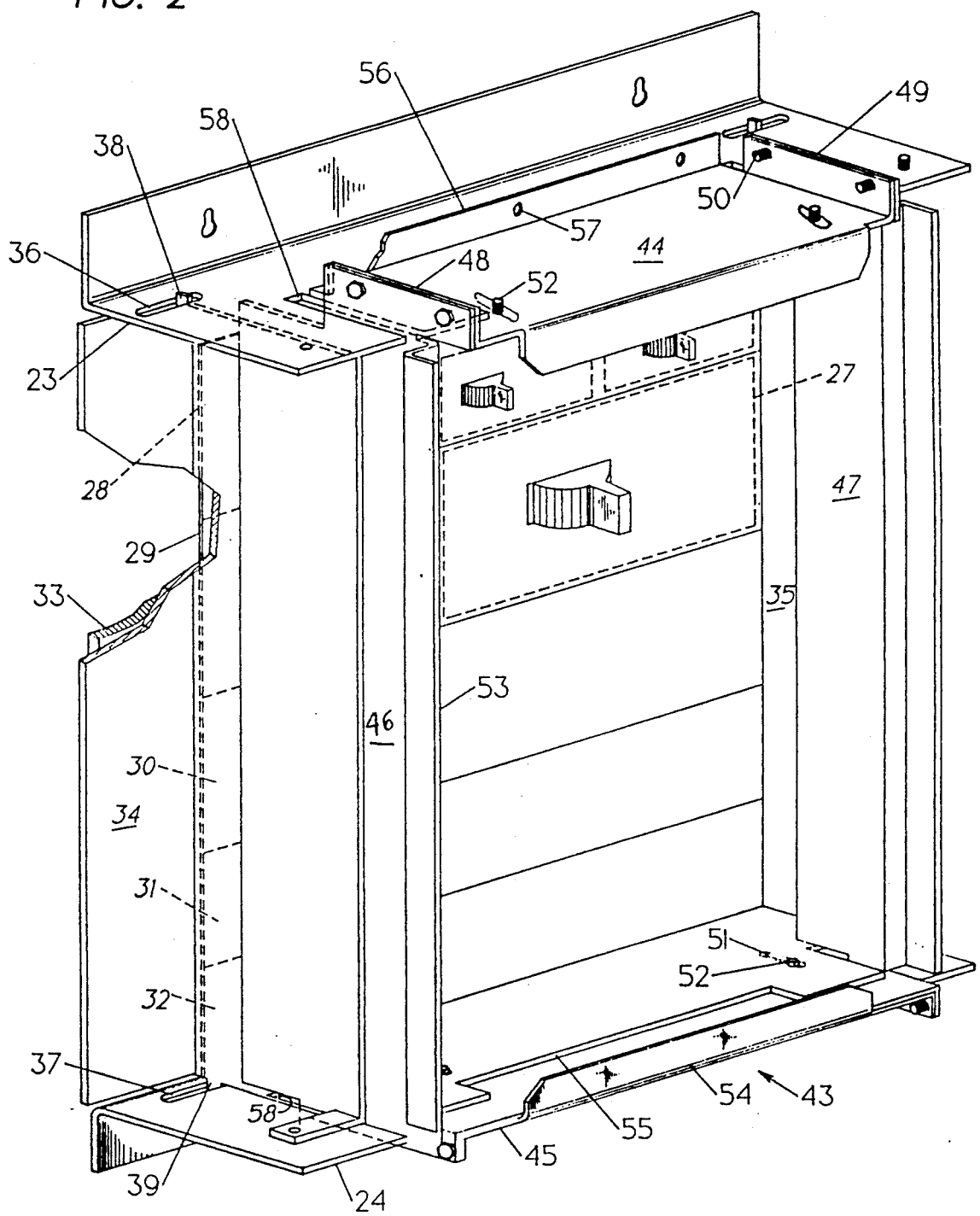
FIG. 2 is a simplified perspective view of some aspects of the present invention.
Figure 3:
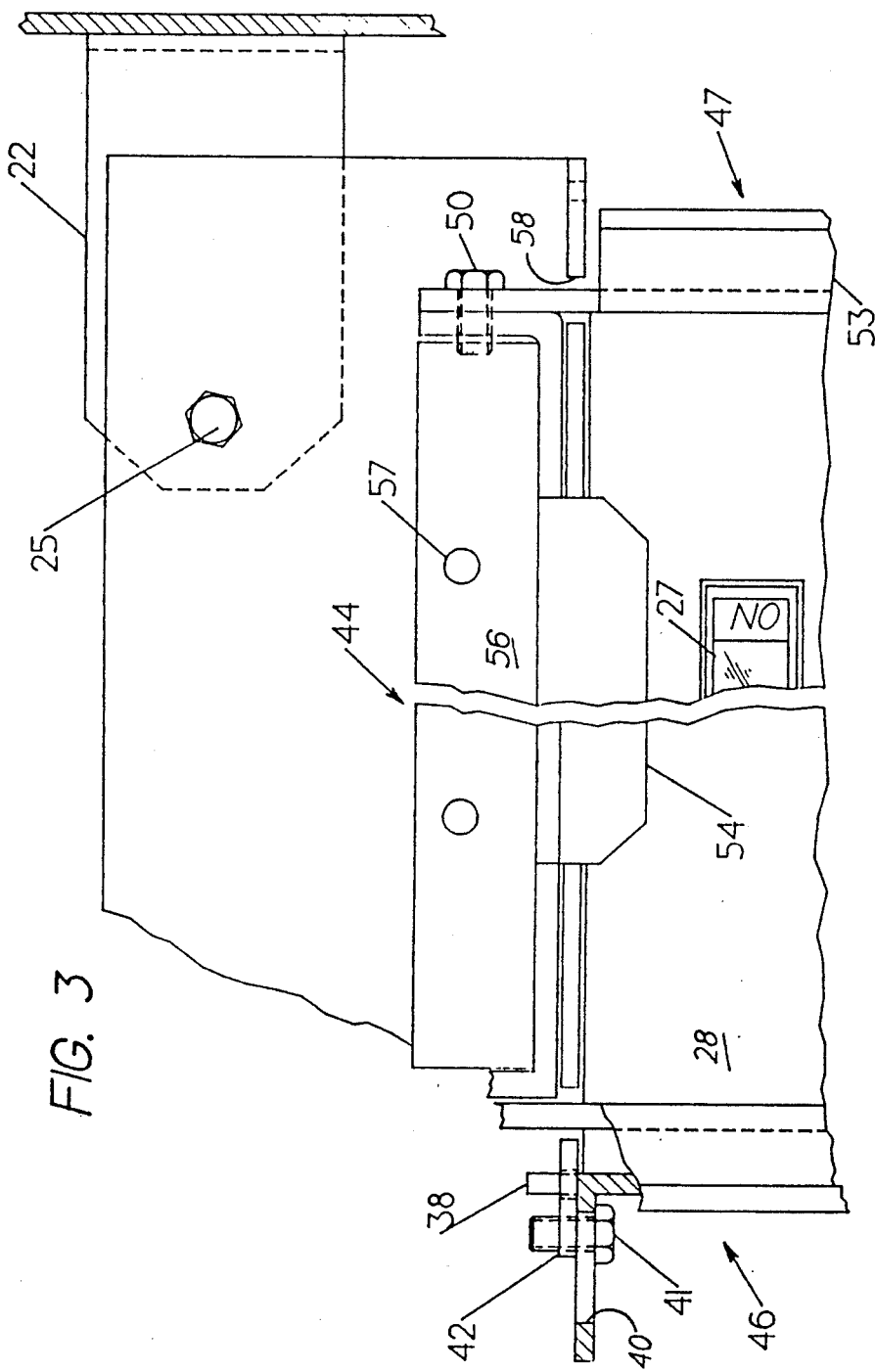
FIG. 3 is a fragmentary, partially sectioned and partially broken away front elevation view of a portion of a panel board incorporating the present invention.

Referring to FIGS. 1-4, a panel board assembly is shown mounted behind a suitable opening 10 in a wall 11 of a building. The principal structure of a panel board is a metal box, a portion of the left and right walls 12, 13 thereof being illustrated in FIG. 1. The walls have corresponding flanges 14, 15 formed therein to receive screws 16, 17 which hold a door frame assembly 18 in place when the installation is complete. The door frame assembly includes a hollow rectangular frame member 19 and a door 20 disposed thereon by a hinge 21. The box walls 12, 13, each have a pair of large angle brackets 22 disposed thereon, such as by spot welding, above and below the region where the switches, circuit protective devices, other components or filler plates are mounted. Only the upper right hand bracket is illustrated in FIGS. 1 and 3 herein. The brackets support a pair of cross members 23, 24 which are secured thereto with bolts 25 which pass through key hole slots 26. Thus, the two cross members become a main mounting structure, rigidly secured within the box, once they are bolted to the angle brackets.

Figure 4:
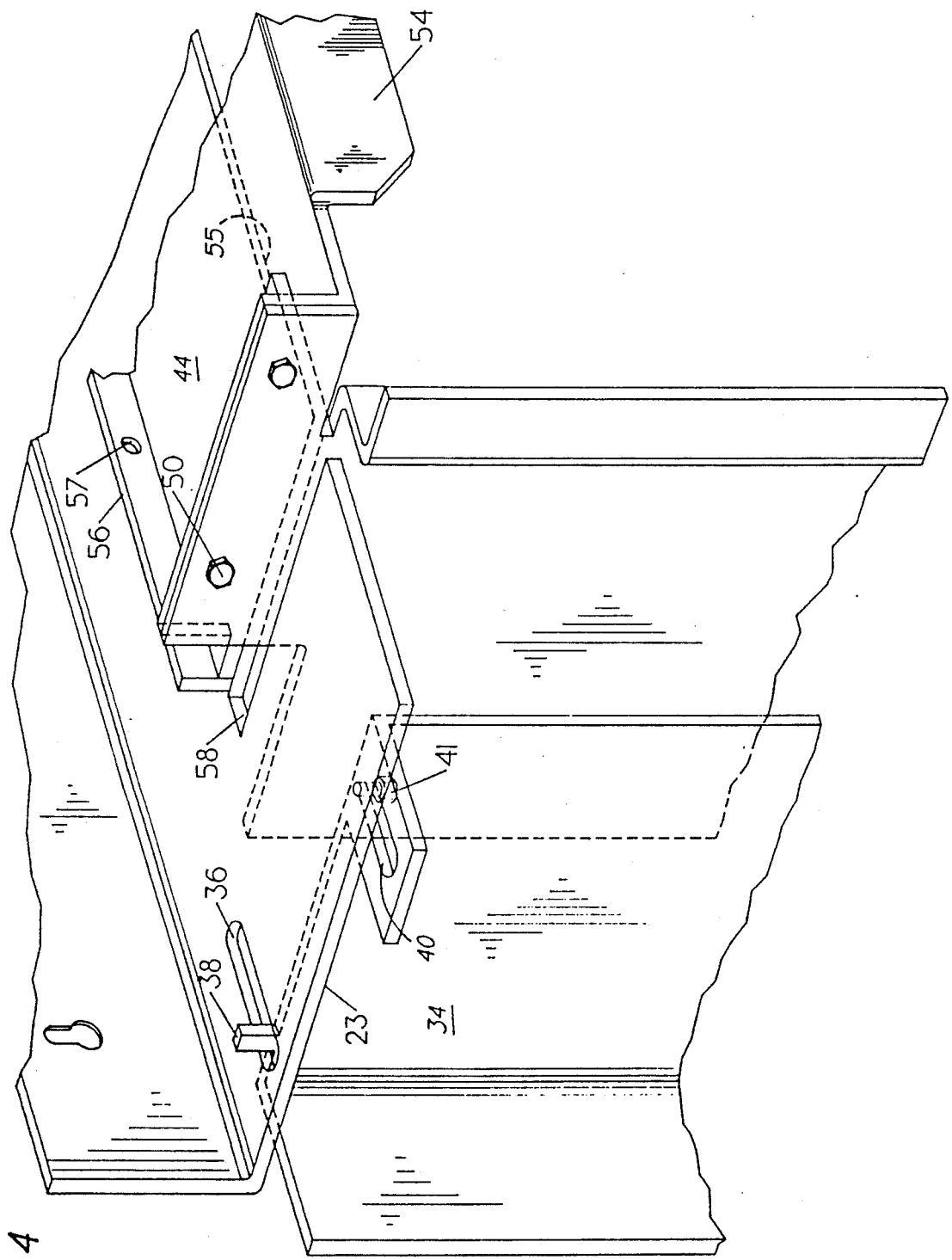
FIG. 4 is a fragmentary perspective view of one corner of panel board apparatus in accordance with the present invention.

The switches and circuit protective devices 27 are mounted on panels 28, 29 (top of FIG. 1; FIGS. 2 and 3), and additional panels 30-32 act as filler plates (FIG. 2). The panels are trapped in a vertically aligned relationship within longitudinally extending slots 33' (top of FIG. 1) formed by sheet metal 33 which is suitably disposed (such as by spot welding) to adjustable side rails 34, 35. The left side rail is shown in FIGS. 1, 3 and 4, and the right side rail is shown partially in FIG. 2. The cross members 23, 24 each have a pair of slotted holes 36, 37 therein (FIGS. 1, 2 and 4) which receive tabs 38, 39 which extend vertically (both up and down) from the ends of the adjustable side rails 34, 35. Each end of the side rails has a slotted hole 40 formed in a tab thereof, through which bolts 41 threaded into holes 42 (FIG. 3) secure the front of the side rails to the cross members. In practice, all the panels 29-32 are installed with their edges vertically aligned (as seen in FIG. 2). Then, the side rails 34, 35 are slid toward the center of the panel board so that the slot 33' (and a similar slot on the other side rail) traps the end edges of the panels, after which bolts 41 are tightened holding the side rails in place with the panels trapped therein. Since there is no stress or tendency toward movement, the friction between the slots and the panels and the tightness of the bolts are sufficient to hold the side rails in place. The sideward-adjustable side rails that capture the panels are one aspect of the present invention.

Referring to FIG. 2, another aspect of the present invention is an adjustable frame 43 which provides a quick acting, flush adjust system for electric power panel boards. The adjustable frame 43 includes two end pieces 44, 45 and two side pieces 46, 47. The end pieces each have a pair of lips 48, 49 extending vertically outward from the side edges thereof, which have threaded holes to receive bolts 50 to secure the end pieces to the ends of the side pieces. The adjustable frame 43 is slidable forward (towards the opening of the box) and rearward (towards the back of the box) a virtue of a pair of slotted holes 51 (FIGS. 1 and 2) in each of the end pieces. Each slot is slidable around a corresponding bolt 52 which is threaded into a tapped hole in a related one of the cross members. When the bolts are loosened a little, the entire adjustable frame 43 may be slid inwardly (rearward) or outwardly (forward) to a desired position, and then the bolts may be tightened so as to retain the adjustable frame in a correct orientation with respect to the panel board and its door/frame assembly. The bolts 52 extend from the interior of the adjustable frame 43 and are threaded into the cross members 23, 24 so that they may be easily loosened and tightened from inside of the adjustable frame, as essentially the last step in assembling a panel board, even after the door frame assembly 18 has been bolted thereto.

The forward edges of the side pieces 46, 47 have steps 53 in them which provide a certain additional right-to-left latitude (see FIG. 1) in the adjustment of the structures within the panel board relative to the position of the door frame assembly 18. Thus, the steps prevent misalignment (right-to-left) with respect to the door 20 while still providing integrity to the interior of the panel board.

The end pieces 44, 45 have inwardly extending lips 54 thereon which serve two functions. They act as handles for an installer to pull against while adjusting the adjustable frame 43 to a correct forward position either in alignment with the wall 11 or in abutment with the door frame assembly 18. The lips also provide a certain latitude in the up-down direction with respect to the opening of the door. Each of the cross members 23, 24 have a recess 55 in the front edge thereof to facilitate receiving the lips of the end pieces in a flush relationship, when the adjustable frame 43 is in its extreme rearward position. The end pieces may include outwardly extending lips 56 having holes 57 therein to permit bolting an adjustable frame end filler (not shown) thereto when used; the adjustable frame end filler simply accommodates the lack of top-to-bottom symmetry of the box interior versus the top-to-bottom symmetry of the door, and allows covering an area that would otherwise be exposed when the door is open. By bolting the adjustable frame end filler to the outwardly extending lips, the filler is moved backwardly and forwardly with the adjustable frame and thus can be positioned flush with the building wall 11 or abutting the interior of the door frame assembly 18.

The top and bottom edges of the side pieces 46, 47 pass through corresponding slots 58 in the horizontal sections of the cross members. By means of the slots, the end pieces 44, 45 can be mounted exteriorly (outboard) of the cross members 23, 24 and the joint between the end pieces and the side pieces formed by the bolts 50 can be out of sight, leaving a neat interior corner as seen in the lower right corner of FIG. 2. It is to be noted that the illustrations herein are not to scale and exaggerate many of the features; the slot 51 in the lower right-hand corner of FIG. 2 would generally be hardly visible in a natural installation of a properly executed embodiment of the present invention. If desired, the adjustable frame 43 may be formed with the end pieces 44, 45 disposed inwardly of the cross members 23, 24, by forming the adjustable frame in a different manner. For instance, it could be formed of a single piece bent to provide contiguous end walls and side walls with a single welded joint at a corner or along a wall, or with a butted or lapped joint extending inwardly or slidable in slots within the side rails 34, 35 or within the cross members 23, 24; or in other, similar ways. In such case, the slotted holes 51 should be in the end wall of the adjustable frame and the bolts 52 should thread into tapped holes in cross members 24, 25.

The adjustable side rails 34, 35 may be used in flush installations without the adjustable frame 43, when suitable. Similarly, the adjustable frame may be utilized in panel boards which do not use the adjustable side rails. Of course, it is possible to use certain features disclosed in the preferred embodiment hereof, while not using other features thereof.

Thus, there is provided a panel board which includes complete occlusion with metal walls, traps panels in desired position, facilitates easy adjustment to accommodate variations in the depth of mounting of a panel board box within the wall of the building, is adjustable as essentially the last step of the installation operation, and accommodates other variations in up/down and side-to-side alignment of the panel board box with respect to the building, and of the door frame assembly with respect to the structures within the box.

Having thus described our invention, what we claim as new and desire to secure by Letters Patent is:

1. An electric panel board for mounting in a building to enclose components such as electric switches, circuit protective devices and the like, comprising:
   a box, having an opening for gaining access thereto, for mounting to the building;
   a pair of cross members disposed in fixed relationship within the box, one of said cross members being at the top and the other of said cross members being at the bottom of the region within which electric switches, circuit protective devices and other components are to be disposed, said cross members each having a horizontal planar section; and
   a pair of horizontal end walls and a pair of vertical side walls joined together into an adjustable frame, each end wall contiguous with a surface of the horizontal planar section of a corresponding one of said cross members, each end wall being adjustably disposed to the corresponding cross member by at least one bolt extending through a slotted hole into a tapped hole, said adjustable frame being slidable front-to-back with respect to said cross members when said bolts are loosened, and being firmly secured to said cross members when said bolts are tightened.

2. A panel board according to claim 1 wherein said end walls each have a lip extending vertically inward from the front edge thereof which serves as a handle to permit sliding said adjustable frame toward the opening of said box.

3. A panel board according to claim 1 wherein the forward edge of each of said side walls has a step therein providing a side-to-side surface to accommodate sideward misalignment between said adjustable frame and the opening in said box.

4. A panel board according to claim 1 further comprising a pair of adjustable side rails, each having a vertically-extending slot for trapping the side edges of a plurality of panels mounted in said box, each end of which is adjustably secured to a horizontal planar section of said cross members near the side edges thereof by a bolt passing through a slotted hole into a tapped hole, said side rails being movable from side to side to trap the end edges of the panels when said bolts are loose and being firmly secured to said cross members when said bolts are tightened.

5. A panel board according to claim 4 wherein:
   each end of each said side rail has a tab extending vertically from the end of each said side rail near a rear edge thereof; and
   said cross members each have a slotted hole oriented sidewise near the rear edge of the horizontal planar section thereof within which a corresponding one of said tabs is free to slide from side to side when said bolts are loose.

6. An electric panel board for mounting in a building to enclose components such as electric switches, circuit protective devices and the like, comprising:
   a box, having an opening for gaining access thereto, for mounting to the building;
   a pair of cross members disposed in fixed relationship within the box, one of said cross members being at the top and the other of said cross members being at the bottom of the region within which electric switches, circuit protective devices and other components are to be disposed, said cross members each having a horizontal planar section with a front edge oriented toward the opening of the box, and a pair of slots extending vertically entirely through each said horizontal planar section from each said front edge rearwardly through a substantial portion of each said horizontal planar section; and
   an adjustable frame including a pair of horizontal end pieces, each contiguous with the outboard surface of a corresponding one of the horizontal planar sections of said cross members, said cross members having slotted holes therein and said end pieces having threaded holes therein with bolts extending through said slotted holes into said threaded holes, said end pieces having outwardly extending vertical lips thereon parallel with and adjacent to said slots, and a pair of side pieces, each extending through corresponding slots of said cross members, the ends of which are secured to the outwardly extending lips of said end pieces, said adjustable frame being slidable front to back with respect to said cross members within said slots when said bolts are loosened, and being firmly secured to said cross members when said bolts are tightened.

7. A panel board according to claim 6 wherein said end pieces each have a lip extending vertically inward from the front edge thereof which serves as a handle to permit sliding said adjustable frame toward the opening of said box.

8. A panel board according to claim 6 wherein the horizontal planar sections of said cross members each have a forward edge with a recess therein to accommodate the lips of said end pieces when said adjustable frame is in its extreme rearward position.

9. A panel board according to claim 6 wherein the forward edge of each of said side pieces has a step therein providing a side-to-side surface to accommodate sideward misalignment between said adjustable frame and the opening in said box.

10. A panel board according to claim 6 wherein said end pieces each have a rear edge with a lip extending vertically outward therefrom with holes therein to which an end filler may be fastened.

11. An electrical panel board for mounting in a building to enclose components, such as electric switches, circuit protective devices and the like mounted on panels, comprising:
   a box, having an opening for gaining access thereto, for mounting to the building;
   a pair of cross members disposed in fixed relationship within the box, one of said cross members being at the top and the other of said cross members being at the bottom of the region within which panels mounting electric switches, circuit protective devices and other components are to be disposed, said cross members each having a horizontal planar section with a front edge oriented toward the opening of the box; and
   a pair of adjustable side rails, each having a longitudinally-extending slot for trapping the side edges of panels mounted in said box, each end of said shoe rails being adjustably secured to a horizontal planar section of said cross members near side edges thereof by a bolt passing through a slotted hole into a tapped hole, said side rails being movable from side to side to trap the side edges of the panels when the bolts are loose and being firmly secured to said cross members when the bolts are tightened.

* * * * *